(12) United States Patent
Zazula et al.

(10) Patent No.: US 10,233,706 B2
(45) Date of Patent: Mar. 19, 2019

(54) SYSTEM, APPARATUS, AND METHOD FOR RECOVERING BARITE FROM DRILLING FLUID

(71) Applicant: National Oilwell Varco Canada ULC, Leduc (CA)

(72) Inventors: Rennie K. Zazula, Weyburn (CA); Dean M. Bird, Sherwood Park (CA); Donald T. Crosswhite, Edmonton (CA)

(73) Assignee: National Oilwell Varco Canada ULC, Leduc, Alberta (CA)

( * ) Notice: Subject to any disclaimer, the term of this patent is extended or adjusted under 35 U.S.C. 154(b) by 958 days.

(21) Appl. No.: 14/583,536

(22) Filed: Dec. 26, 2014

(65) Prior Publication Data

US 2016/0184741 A1    Jun. 30, 2016

(51) Int. Cl.
*B01D 21/26* (2006.01)
*E21B 21/06* (2006.01)

(52) U.S. Cl.
CPC .......... *E21B 21/065* (2013.01); *B01D 21/262* (2013.01); *B01D 2221/04* (2013.01)

(58) Field of Classification Search
CPC . B01D 21/262; B01D 2221/04; E21B 21/065; E21B 21/066
USPC ................................................. 210/801, 533
See application file for complete search history.

(56) References Cited

U.S. PATENT DOCUMENTS 4,395,129 A * 7/1983 Musil .................. E01C 19/1036
366/228
6,926,101 B2 8/2005 deBoer

FOREIGN PATENT DOCUMENTS

CN          203022663 U  *  6/2013
WO        2013/075252 A1    5/2013

* cited by examiner

*Primary Examiner* — Walter D. Griffin
*Assistant Examiner* — Shuyi S. Liu
(74) *Attorney, Agent, or Firm* — Amerson Law Firm, PLLC

(57) ABSTRACT

A barite recovery hopper includes a shell having an open top, wherein the barite recovery hopper is adapted to receive a flow of recovered barite particles from a solids discharge chute of a decanter centrifuge through the open top of the shell. An inlet is adapted to receive a flow of drilling mud from a mud tank. A hopper bypass gate is adapted to seal a bottom opening of the shell when the hopper bypass gate is in a closed position during a barite recovery operation, and to allow collection of at least a portion of the recovered barite particles for mixture, inside of the barite recovery hopper, with the flow of drilling mud received through the inlet when the hopper bypass gate is in the closed position. An outlet is adapted to discharge a flow of the recovered barite particle/drilling mud mixture to the mud tank.

20 Claims, 8 Drawing Sheets

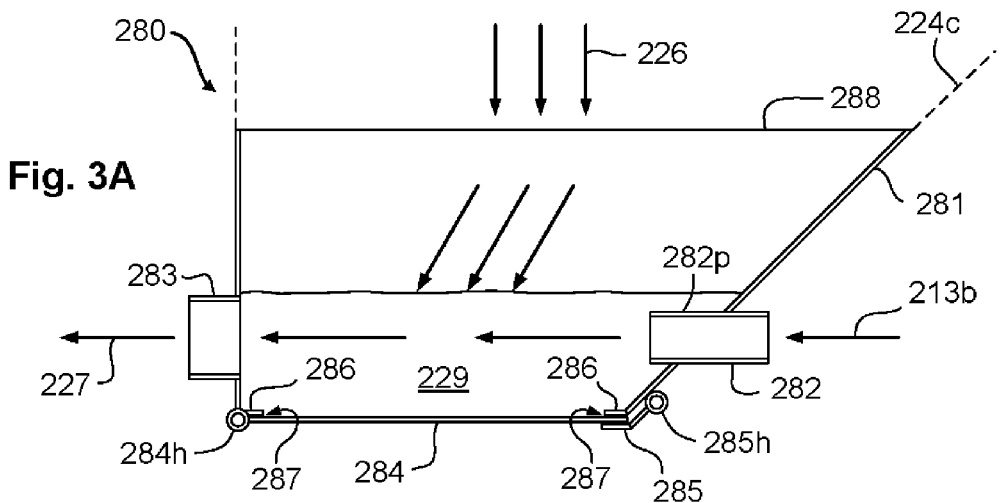
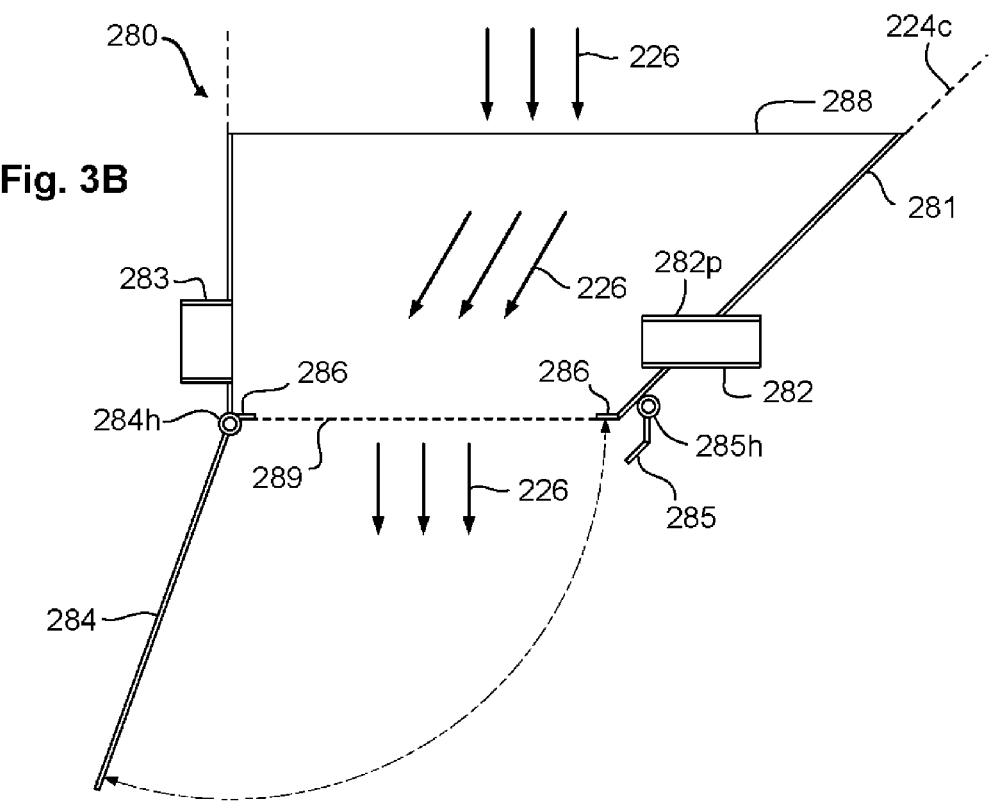

SYSTEM, APPARATUS, AND METHOD FOR RECOVERING BARITE FROM DRILLING FLUID

BACKGROUND

1. Field of the Disclosure

The present subject matter is generally directed to drilling operations, and in particular, to systems, apparatuses, and methods that may be used for recovering high density solids particles such as barite from drilling fluid.

2. Description of the Related Art

During a typical well drilling operation, such as when an oil and gas well is drilled into the earth, a drilling mud circulation and recovery system is generally used to circulate drilling fluid, i.e., drilling mud, into and out of a wellbore. The drilling mud provides many functions and serves many useful purposes during the drilling operation, such as, for example, removing drill cuttings from the well, controlling formation pressures and wellbore stability during drilling, sealing permeable formations, transmitting hydraulic energy to the drilling tools and bit, and cooling, lubricating, and supporting the drill bit and drill assembly during the drilling operations.

In order to control formation pressures and wellbore stability during drilling operations, the drilling mud must have a great enough density so that the weight of the column of fluid at any point in the wellbore is sufficient to prevent the local geological forces in the surrounding formation from collapsing the wellbore. Additionally, the density of drilling mud must also be great enough to prevent an undesirable ingress of fluid that may be present in the surrounding formation from entering the wellbore, which can tend to migrate to the surface and increase the potential for a well blowout scenario. Accordingly, the drilling mud is generally designed and formulated, and in particular the density or "weight" of the mud is often adjusted, in view of these various operating scenarios with a goal of providing a more reliable, consistent, and predictable overall drilling operation.

Drilling muds commonly include many different types of desirable solid particles that aid in performing one or more of the functions and purposes outlined above. These solids particles used in drilling muds may have one or more particular properties which makes their presence in a particular drilling mud mixture desirable and beneficial. For example, in certain applications, some solids particles may need to be of a certain size or size range, which may be useful in sealing off more highly permeable formations so as to prevent the loss of valuable drilling fluid into the formation—so-called "lost circulation materials." In other applications, such as when relatively high wellbore pressures are anticipated or encountered, other solids particles may need to be of a certain density or "weight" so as to control and balance forces within the wellbore, which may be added to the drilling mud as necessary so as to guard against wellbore collapse or even a well blowout during the drilling operation.

In some drilling applications, the base fluid of the drilling mud—which may substantially be water, a hydrocarbon-based fluid, a synthetic hydrocarbon replacement fluid, and/or some combination thereof—may be used to create what is sometimes referred to as an "unweighted" drilling mud. Typically, the base fluid is the primary constituent in an unweighted drilling mud, and any suspended solids particles present in the unweighted drilling mud would usually only include so-called "native solids," which are generally any dispersed clays, sand, chert, and/or other rock that originates from formations being drilled. In general, unweighted drilling muds are most often used in relatively shallow drilling operations when the wellbore formation pressures are typically lower than the competing hydrostatic head pressure of the drilling fluid. However, in drilling applications where the formation pressures are high enough to exceed the hydrostatic head pressure of the drilling fluid, solids particles having a greater density, or specific gravity, must be added to the drilling mud mixture so as to increase the overall density of the mud, thus creating what is often referred to as a "weighted" drilling mud.

For example, in some applications, high density particulate materials such as barium sulfate, or barite, ($BaSO_4$), are often used for this purpose, as their greater unit volumetric weight serves to counterbalance the high formation pressures and/or the mechanical forces that are often caused by formations that would otherwise begin sloughing during the drilling process. Furthermore, in at least some cases, solids particles may be added to the drilling mud based on a combination of the particle size and density, such as when a specific combination of the two properties may be desirable. As would be appreciated by those of ordinary skill, the drilling mud in general, and the added solid particles in particular, can often be very expensive. As such, in some applications, various systems and processes have been implemented so that the desirable—and valuable—solids particles can be recovered and re-used during the ongoing drilling cycle.

Once the drilling mud has served its initial purposes downhole, the mud is then circulated back up and out of the well so that it can carry the drill cuttings that are removed from the advancing wellbore during the drilling operation up to the surface. As may be appreciated, the drill cuttings that are generated during the drilling operation, which are also solids particles, are generally thoroughly mixed together with other beneficial solids particles that may have been added to the base fluid so as to make up the drilling mud. Therefore, these drill cuttings must be separated from the desirable solids particles which, in the case of weighted drilling muds would be higher density solids particles, such as barite and the like. In the best possible drilling scenario, it is advantageous for the drill cuttings to be substantially larger than the desirable solids particles making up the drilling mud, thus enabling a substantial portion of the drill cuttings to be removed during a primary separation step using vibratory separator devices that separate particles based upon size, such as shale shakers and the like. However, in most applications, a portion of the drill cuttings returning with the drilling mud are similar in size, or even smaller than, at least some of the desirable solids particles contained in the drilling mud, in which case secondary separation devices, such as hydrocyclones and/or decanter centrifuges and the like, are often employed so as to obtain further particle separation.

For example, in accordance with API Specification 13A, barite that is added to drilling mud is required to be made up of particles having a particle size distribution wherein no more than 3 weight percent is coarser than 75 microns and no more than 30 weight percent is finer than 6 microns. As such, the majority of the barite particles that are used in drilling mud have a particle size that ranges from 6-75 microns, with the allowances outside of this range as noted above. Furthermore, the median particle size in this distribution range is typically on the order of around 50 microns. When using a shale shaker or other vibratory separator, better operational proficiency is achieved by the machines when the size of the drill cuttings particles are at least twice that of the valuable solids particles—e.g., barite—that are desirable to keep in the drilling mud mixture. Therefore, drill cuttings particles that are 150 microns or larger can generally be separated rather efficiently from particles such as barite using well known and commonly available screen separation technology.

However, it should be appreciated that while the sizes of a large majority of the drill cuttings particles enable them to be separated with machines that utilize vibratory screening techniques, such as shale shakers and the like, the sizes of many solids particles do not always conveniently fall within the size range that permits such relatively easy separation, e.g., the 150 micron size threshold noted above. The simple reason for this is that there are many factors that can influence the eventual size of drill cuttings particles returned with the drilling mud, such as: formation lithology (different rocks/minerals that are encountered as the wellbore progresses through different formation strata); type of drill bit used (PDC bits cut or shear rock; roller-cone bits crush rock); weight on bit (downward force exerted on the bit by gravity and/or mechanical forces); drilling rate (feet per hour), and the like. Accordingly, the sizes of at least some of the drill cuttings particles will fall squarely within the size range of the drilling mud's desirable solids particles, such as the 6-75 micron size range of barite particles, as noted above.

There are a variety of reasons why it is desirable, and even necessary, to remove as many of the drill cuttings particles from the drilling mud mixture as possible. A first reason would be so as to control and/or maintain the drilling mud chemistry and composition within a desirable range as consistently as possible. For example, the presence of drill cuttings particles in the drilling mud mixture may have a significant effect on the weight of the mud, which could potentially lead to wellbore collapse, and/or a blowout scenario associated with possibly hazardous overpressure conditions within the well. More specifically, because the specific gravity of the drill cuttings particles (that is, the ratio of the drill cuttings particle density to that of water) are normally significantly lower than that of the desired solids particles in the drilling mud, e.g., barite, then the presence of cuttings particles left in the mud by the typical solids removal processes can cause the weight of the drilling mud to be lower than required when the cuttings particles displace the barite. Mineralogically pure barite, or barium sulfate, has a density of about 4.5 $gm/cm^3$ (or a specific gravity of 4.5), whereas the types of cuttings materials that are most typically encountered during drilling operations have a specific gravity that is less than 3.2, and generally falls in the range of about 2.5 to 3.0.

Additionally, the presence of undesirable solids materials in the drilling mud can also have an adverse effect on the flow and/or hydraulic characteristics of the mud, which could thus potentially have a detrimental influence the operational efficiency of the hydraulically driven downhole tools, lubrication and cooling of the drill bit, and the like. Furthermore, depending on the types of materials (e.g., rocks/minerals) that make up the drill cuttings, the drill cuttings particles can be highly abrasive, and therefore could be damaging to the drilling mud circulation equipment, such as mud pumps, seals, valves, and the like. In such cases, expensive drilling downtime may be encountered during the repair and/or replacement of inordinately worn or damaged equipment. Accordingly, rig operators generally go to great lengths to remove as many of the returned drilling cuttings particles from the drilling mud as is possible. Furthermore, in the case of weighted drilling muds, operators also make every reasonable effort to recover and re-use as much of the high density (e.g., barite) particulate material as may be economically feasible. To that end, various systems and methods have been employed in an effort to separate high density solids particles from low density drill cuttings particles.

Barite recovery in many prior art applications is generally performed after at least a primary separation step based on particle size has been performed, for example, by using vibratory separator screening systems such as shale shakers. Typically, the prior art method of recovering and re-using the beneficial high density particles (e.g., barite) that have been added to weighted drilling mud involves a three-step approach, which includes: 1) removing barite from the spent (returned) drilling fluid; 2) removing the detrimental low-density solids (small-sized drill cuttings particles) from the drilling fluid; and 3) returning the cleaned drilling mud and recovered barite to the drilling rig's active mud system for re-use. Typically, the solid particle removal steps noted above are performed using decanter centrifuges, which apply centrifugal forces to the drilling fluid so as to separate heavier/more dense solid particles from lighter/less dense fluids. The operation of decanter centrifuges is well known to those having ordinary skill in the art and therefore will not be described in detail herein other than as may be necessary to convey the operating principles of exemplary prior art barite recovery systems.

When a weighted drilling mud is used during drilling operations, both the beneficial high density (e.g., barite) particles and detrimental low density (drill cuttings) particles will be present in the spent drilling mud after it has been returned from a drilled wellbore. When a decanter centrifuge receives the spent drilling mud containing both high and low density particles and is operated to separate the drill cuttings (low density) solids particles from the mud, the barite particles will also be removed during the same operation, since the centrifugal forces imposed on the low density particles will also cause the higher density particles to separate from the fluid. In order to avoid simultaneously separating the high and low density particles from the spent drilling mud during the same solids separation step, typical barite recovery systems utilize two decanter centrifuges that are arranged in a series operation so as to first remove the higher density barite particles from the drilling mud in a first centrifuge, after which the lower density drilling cuttings particles are moved from the mud in a second centrifuge.

Due to their higher relative density, or specific gravity, barite particles will more readily drop out of the drilling mud than will the lower density drill cuttings particles when subjected to the same level of centrifugal force. As such, a lower centrifugal force is required to remove the high density barite particles than is required to remove the low density drill cuttings particles, which is used to advantage in the typical prior art barite recovery systems. In such systems, the first decanter centrifuge is operated at a substantially lower rotational velocity (RPM) than the second centrifuge, and thus a lower centrifugal force is created within the first centrifuge than within the second centrifuge. Accordingly, the lower centrifugal force created within the first decanter centrifuge will be sufficient to remove the higher density barite particles, but will be less effective in removing the lower density drill cuttings particles. The fluid effluent, or overflow, exiting the first centrifuge is therefore laden with minimal amounts of the higher density barite particles and relatively high levels of lower specific gravity solids, such as drill cuttings particles. The overflow fluid is then directed to the second decanter centrifuge for further separation processing. As noted previously, the second decanter centrifuge is operated at a substantially higher rotational speed (RPM) than the first decanter centrifuge, which in turn applies a substantially greater centrifugal force on the overflow fluid received from the first centrifuge. In this way, the removal of lower density drill cuttings particles from the drilling mud can be maximized, after which the cleaned mud is returned to the drilling rig's active mud system.

FIGS. 1A-1C are schematic flow diagrams that illustrate a prior art drilling mud treatment system 100 that includes a solids removal and recovery system 170 that can be configured to treat both weighted and unweighted drilling fluids. In particular, the solids removal and recovery system 170 shown in FIG. 1A is in an operational configuration that allows desirable high specific gravity particles, e.g., barite, to be recovered from a drilling mud 110 and returned the recovered barite to the active mud system for re-use in further drilling operations. In some instances, the solids removal and recovery system 170 may be referred to herein as a barite recovery system 170 for simplicity.

As shown in FIG. 1A, drilling mud 110 that is returned from a drilled wellbore (not shown) flows through a spent mud flow line 102 to a primary solids separation apparatus 104, such as a shale shaker and the like, for an initial separation step. As the drilling mud 110 passes through the shale shaker 104, larger drilling cuttings 107 are separated from the mud 110 and directed to a drilling cuttings tank or pit 108. The portions of the drilling mud 110 passing through the various screening decks of the shale shaker 104 flow down to a sump 106, and from there are directed to the active mud system tank or pit 112 for further processing.

In some configurations of the drilling mud treatment system 100, a flow of the drilling mud 110 may be directed through one or more intermediate mud treatment and/or solids separation apparatuses, which are collectively depicted schematically in FIG. 1A as system 160. For example, the system 160 can include an apparatus for removing entrained gases from the drilling mud 110 (e.g., vacuum or atmospheric degasser), as well as apparatus(es) for removing sand and/or silt from the mud 110 (e.g., desander and/or desilter hydrocyclones). It should be appreciated that the design and operation of such additional treatment and/or separation apparatuses is well known in the art, and as such will not be described further.

As noted previously, the barite recovery system 170 schematically depicted in FIG. 1A is configured for recovering barite from the drilling mud 110 for re-use in further drilling operations. As shown in FIG. 1A, the barite recovery system 170 includes first and second decanter centrifuges 124 and 144, both of which are operated to remove solids particles from drilling mud 110. The barite recovery system 170 also includes a barite mixing tank 134 that is used to temporarily store and blend barite that has been recovered from the drilling mud 110 during the barite recovery process, as well as first and second solids disposal pits or tanks 132 and 150 that can be used for temporary storage of the solids that are removed from the mud 110 using the respective first and second centrifuges 124, 144, prior to eventual disposal. Furthermore, the barite recovery system 170 includes a plurality of pumps 120, 138, 140, and 145 are used to generate various flows of drilling mud 110 through the system 170, as well as a plurality of flow redirection devices 130, 135, and 142 that can be used to direct the various flows of drilling mud 110 to specific apparatuses of the system 170, as will be further described below.

As shown in FIG. 1A, during a barite recovery operation, a first pump 120 is used to generate a flow 113 of drilling mud 110 from the mud tank 112 to an inlet of the first decanter centrifuge 124. The first decanter centrifuge 124 receives the entire flow 113 of drilling mud 110 and is operated at a relatively low RPM (as described above) so as to separate the flow 113 into a first solids underflow, or reject, portion 126 and a first fluid overflow portion 128. The first solids underflow portion 126 is primarily composed of a relatively high percentage of higher density barite particles and a relatively small percentage of lower density drill cuttings particles mixed into a slurry with a small amount of drilling fluid, whereas the first fluid overflow portion 128 is primarily made up of drilling fluid 110 with a relatively high percentage of lower density drill cuttings particles and a relatively low percentage of higher density barite particles.

Upon exiting the underflow outlet of the first decanter centrifuge 124, the first solids underflow slurry 126, which is primarily composed of recovered barite, flows to a first flow redirection apparatus 130, which is operated so as to direct the barite underflow slurry 126 to the barite mixing tank 134, as is indicated by the blackened flow branch of the first flow redirection apparatus 130 and the dashed line between the first apparatus 130 and the solids disposal tank 132. Typically, the first flow redirection apparatus 130 is a simple slide or chute that can be configured and arranged so that the first solids underflow slurry 126 is directed to the appropriate location or apparatus, such as the barite mixing tank 134 as shown in FIG. 1A, or to a solids disposal tank 132, as will be further described in conjunction with FIG. 1B below. Additionally, when the prior art system 170 is configured for barite recovery, a flow 115 of drilling mud 110 is typically generated by a second pump 138 from the mud tank 112 to the barite mixing tank 134, where it can be mixed and blended with the barite underflow slurry 126 by an agitator 136, thereby creating a blended drilling mud/barite mixture 139 that can be pumped back to the mud tank 112. In the barite recovery configuration depicted in FIG. 1A, the second pump 138 generates the flow 115 of drilling mud 110 to a second flow redirection apparatus 135, such as a three-way valve, which is in turn operated so as to direct the flow 115 to the barite mixing tank 134, as indicated by the blackened flow branch of the second flow redirection apparatus 135. Thereafter, a flow 137 of the blended drilling mud/recovered barite mixture 139 is then generated back to the mud tank 112 by a third pump 140 so that the recovered barite can be re-used for further drilling operations.

Also as shown in FIG. 1A, when the barite recovery system 170 is configured in the barite recovery mode, the first fluid overflow portion 128 exiting the overflow outlet of the first decanter centrifuge 124 flows to a third flow redirection apparatus 142, e.g., a three-way valve or flow chute, which is operated or configured so that the first overflow portion 128 is directed to an overflow staging tank 143, as indicated by the blackened flow branch of the third flow redirection apparatus 142. A fourth pump 145 is then used to pump the first overflow portion 128 from the overflow staging tank 143 to a second decanter centrifuge 144 for further solids particle separation. The second decanter centrifuge 144 receives the first fluid overflow portion 128 and is operated at a substantially higher RPM relative to that of the first centrifuge 124 (as described above) so as to separate the first overflow portion 128 into a second solids underflow, or reject, portion 146 and second fluid overflow portion 148. The second solids underflow portion 146 exiting the second centrifuge 144 typically flows into a solids disposal tank or pit 150, and is composed primarily of lower density drill cuttings particles mixed into a slurry with some amount of drilling fluid, as well as a relatively small amount of higher density barite particles that are carried over from the first centrifuge 124. The second fluid overflow portion 148 exits the second decanter centrifuge 144 as a "clean" drilling mud 110, which generally contains only relatively small amounts of either high or low density solids particles, and is returned to the mud tank 112 for mixing and blending with the recovered barite, as shown in FIG. 1A.

In some prior art applications, the second fluid overflow portion 148, i.e., the "cleaned" drilling mud 110, is returned to the suction chamber or compartment (not shown) of the mud tank 112, along with the flow 139 of blended drilling mud/recovered barite mixture. A mud pump 116 then draws the cleaned and treated drilling mud 110 through a suction line 114 from the suction chamber and pumps the treated drilling mud 110 through a discharge line 118 to a rotary line (not shown) attached to a drill string (not shown), and back down into the wellbore (not shown).

FIGS. 1B and 1C schematically depict the drilling mud treatment system 100 of FIG. 1A wherein the barite recovery system 170 is configured to process unweighted drilling mud 110. As noted previously, an unweighted drilling mud is one wherein most if not all of the solids particles remaining in the flow 113 of drilling mud 110 treated by the system represent drill cuttings particles, because no high density barite particles have been added to, or need to be recovered from, the drilling mud 110. Turning first to FIG. 1B, the barite recovery system 170 is configured so that the first and second decanter centrifuges 124 and 144 are arranged for parallel flow. More specifically, since there is no barite being recovered by the first decanter centrifuge 124, then there is no underflow slurry 126 of recovered barite being sent to the barite mixing tank 134 for the flow 115 of drilling mud 110 to be mixed with. Accordingly, the second flow redirection apparatus 135 is operated so that the flow 115 of drilling mud 110 from the mud tank 112 that is generated by the second pump 138 is directed to the second centrifuge 144 for separation, thus bypassing the barite mixing tank 134, as is indicated by the blackened flow branch of the second flow redirection apparatus 135 and the dashed line between the second apparatus 135 and the barite mixing tank 134. Meanwhile, the flow 113 of drilling mud 110 generated by the first pump 120 is still directed to the first centrifuge 124 for separation. Typically, the two centrifuges 124, 144 are operated in substantially similar fashion, e.g., at similar RPM's, so as to separate as much of the solids particles, e.g., drill cuttings, as possible from the drilling mud 110, irrespective of particle size and/or particle specific gravity.

In most applications, the first solids underflow 126 exiting the first decanter centrifuge 124 is a slurry containing a high percentage of the solids particles that initially entered the first centrifuge 124 with the flow 113, mixed together with a small amount of drilling mud 110. The first underflow slurry 126 then flows to the first flow redirection apparatus 130, which is operated and/or configured so as to direct the first underflow slurry 126 to a solids disposal tank 132. In this way, the barite mixing tank 134 is essentially bypassed, as indicated by the blackened flow branch of the first flow redirection apparatus 130 and the dashed line between the apparatus 130 and the barite mixing tank 134. Similarly, the second solids underflow 146 exiting the second decanter centrifuge 144 is also a slurry containing a high percentage of the solids particles that initially entered the second centrifuge 144 with the flow 115, mixed together with a small amount of drilling mud 110. As previously noted with respect to FIG. 1A, the second underflow slurry 146 again flows to the solids disposal tank 150.

The first and second fluid overflow portions 128, 148 typically exit the respective first and second decanter centrifuges 124, 144 as substantially "clean" drilling mud 110, that is, the overflow portions 128 and 148 generally contain only relatively small amounts of solids particles. In the system configuration depicted in FIG. 1B, the third flow redirection apparatus 142 is operated and/or configured so that the first fluid overflow portion 128 exiting the first centrifuge 124 bypasses the overflow staging tank 143 and the second centrifuge 144, as indicated by the blackened flow branch of the apparatus 142 and the dashed line between the apparatus 142 and the overflow staging tank 143. The two fluid overflow portions 128, 148 then flow together as a substantially "clean" flow 152 of drilling mud, which is directed back to the mud tank 112 for recirculation into the drilled wellbore (not shown) by the mud pump 116, as previously described.

Since the barite mixing tank 134 is bypassed, and barite is not being recovered from the drilling mud 110 in the system configuration depicted in FIG. 1B, drilling mud 110 is not circulated from the mud tank 112 to the barite mixing tank 134. Furthermore, the agitator 136 is also not operated, since there is no recovered barite or drilling mud 110 in the barite mixing tank 134 to mix and blend, nor is the third pump 140 operated, since there is no drilling mud mixture to be pumped from the barite mixing tank 134 back to the mud tank 112.

FIG. 1C schematically illustrates the drilling mud treatment system 100 wherein the barite recovery system 170 is configured differently from that shown in FIG. 1B for treating unweighted drilling mud 110. In particular, FIG. 1C depicts the barite recovery system 170 wherein the second flow redirection apparatus 135 is again operated so as to direct the flow 115 of drilling mud 110 generated by the second pump 138 to the second decanter centrifuge 144. Additionally, the first pump 120 is shut in, and therefore is not operated to direct a flow of drilling mud 110 to the first decanter centrifuge 128, as indicated by the dashed lines between the mud tank 112 and the first pump 120 and between the pump 120 and the first centrifuge 124. Furthermore, the third flow redirection apparatus 142 is also operated so as to prevent any backflow of drilling mud 110 from entering the underflow outlet of the bypassed first centrifuge 124, as indicated by the blackened flow branches of the apparatus 142 and the dashed lines between the apparatus 142 and the overflow outlet of the second centrifuge 144.

In the operational configuration of the barite recovery system 170 shown in FIG. 1C, the second decanter centrifuge 144 receives the flow 115 of drilling mud 110 and is operated so as to separate the flow 115 into a solids underflow portion 146, which is discarded into the solids disposal tank 150, and a substantially "clean" drilling fluid overflow portion 148, which is directed back to the mud tank 112 for subsequent re-use in further drilling operations. The system configuration depicted in FIG. 1C is used when the volumetric flow requirements for the drilling mud quantities necessary to support drilling operations are substantially reduced when compared to what can be treated in the parallel system flow configuration of FIG. 1B, or when the first decanter centrifuge 124 is taken out of service for maintenance and/or repair.

As noted previously, the barite recovery system generally described above has been used in many prior art applications to separate, recover, and re-use the desirable and beneficial barite particles from spent drilling mud. However, there are significant capital and operation costs, as well as safety and environment considerations, associated with the fabrication, assembly, and operation of such a prior art barite recovery system. For example, a dedicated barite recovery tank is typically required for temporarily storing the recovered barite, which includes a mud agitator for mixing and blending the recovered barite with drilling mud. Furthermore, additional mud circulation pumps are required so as to pump a substantially continuous supply of drilling mud to the barite recovery tank for mixing with the recovered barite, as well as to pump the recovered barite/drilling mud mixture back to the active mud tank. This requires that additional quantities of drilling mud be purchased and kept on hand to support the mud circulation and mixing/blending activities. Additionally, a significant amount of additional piping is required so as to make up the appropriate interconnections between the extra pieces of equipment (tanks, pumps, etc.), all of which can take up a substantial footprint in areas where plot space often comes at a premium. Moreover, operating the additional tankage, pumping, and plumbing equipment can lead to drilling mud spillage, which brings with it the environmental issues associated with any related cleanup activities, including the disposal of the additional volumes of drilling mud that are required to support the overall barite recover operation.

The present disclosure is directed to barite recovery systems and methods of operating the same that may be used to mitigate, or possibly even eliminate, at least some of the problems associated with the prior art systems described above.

SUMMARY OF THE DISCLOSURE

The following presents a simplified summary of the present disclosure in order to provide a basic understanding of some aspects disclosed herein. This summary is not an exhaustive overview of the disclosure, nor is it intended to identify key or critical elements of the subject matter disclosed here. Its sole purpose is to present some concepts in a simplified form as a prelude to the more detailed description that is discussed later.

Generally, the subject matter disclosed herein is directed to various new and unique systems, apparatuses, and methods that may be used for recovering barite from drilling fluid. In one illustrative embodiment, a barite recovery hopper is disclosed that includes a shell having an open top, the barite recovery hopper being adapted to receive a flow of recovered barite particles from a solids discharge chute of a decanter centrifuge through the open top of the shell. The illustrative barite recovery hopper further includes, among other things, an inlet that is adapted to receive a flow of drilling mud from a mud tank, a hopper bypass gate that is adapted to seal a bottom opening of the shell when the hopper bypass gate is in a closed position during a barite recovery operation. The hopper bypass gate is also adapted to allow collection of at least a portion of the recovered barite particles for mixture, inside of the barite recovery hopper, with the flow of drilling mud received through the inlet when the hopper bypass gate is in the closed position. Additionally, the barite recovery hopper includes an outlet that is adapted to discharge a flow of the recovered barite particle/drilling mud mixture to the mud tank.

In another illustrative embodiment, a system for separating solids particles from drilling mud includes, among other things, a pump that is adapted to generate a flow of drilling mud from a mud tank, a decanter centrifuge, and a solids particle recovery hopper. Additionally, the disclosed system also includes a flow redirection apparatus that is adapted to direct a first flow portion of the flow of drilling mud to the decanter centrifuge and to direct a second flow portion of the flow of drilling mud to the solids particle recovery hopper. The decanter centrifuge is adapted to separate a first portion of the solids particles from a second portion of the solids particles and to direct an underflow that includes the first portion of the solids particles to the solids particle recovery hopper, wherein the solids particle recovery hopper is adapted to create a mixture of the underflow and s the aid second flow portion and to direct a flow of the mixture to the mud tank.

Also disclosed herein is an exemplary method that is directed to, among other things, generating a flow of first drilling mud from an active mud tank to a first flow redirection apparatus, and operating the first flow redirection apparatus to direct a first flow portion of the flow of the first drilling mud to a first decanter centrifuge and to direct a second flow portion of the flow of the first drilling mud to a solids particle recovery hopper. Furthermore, the disclosed method includes operating the first decanter centrifuge to generate, from the first flow portion of the flow of the first drilling mud, a first underflow that includes first solids particles having a first density and to generate a first overflow that includes second solids particles having a second density that is less than the first density, directing the first underflow to the solids particle recovery hopper and mixing the first underflow with the second flow portion of the flow of the first drilling mud in the solids particle recovery hopper. Additionally, a flow of the mixture of the first underflow and the second flow portion of the flow of the first drilling mud is directed from the solids particle recovery hopper to the active mud tank.

BRIEF DESCRIPTION OF THE DRAWINGS

The disclosure may be understood by reference to the following description taken in conjunction with the accompanying drawings, in which like reference numerals identify like elements, and in which:

FIGS. 3A and 3B are schematic illustrations of one exemplary embodiment of a barite recovery hopper that may be used in conjunction with various illustrative embodiments of the barite recovery systems depicted in FIGS. 2A-2D.

Figure 1A:
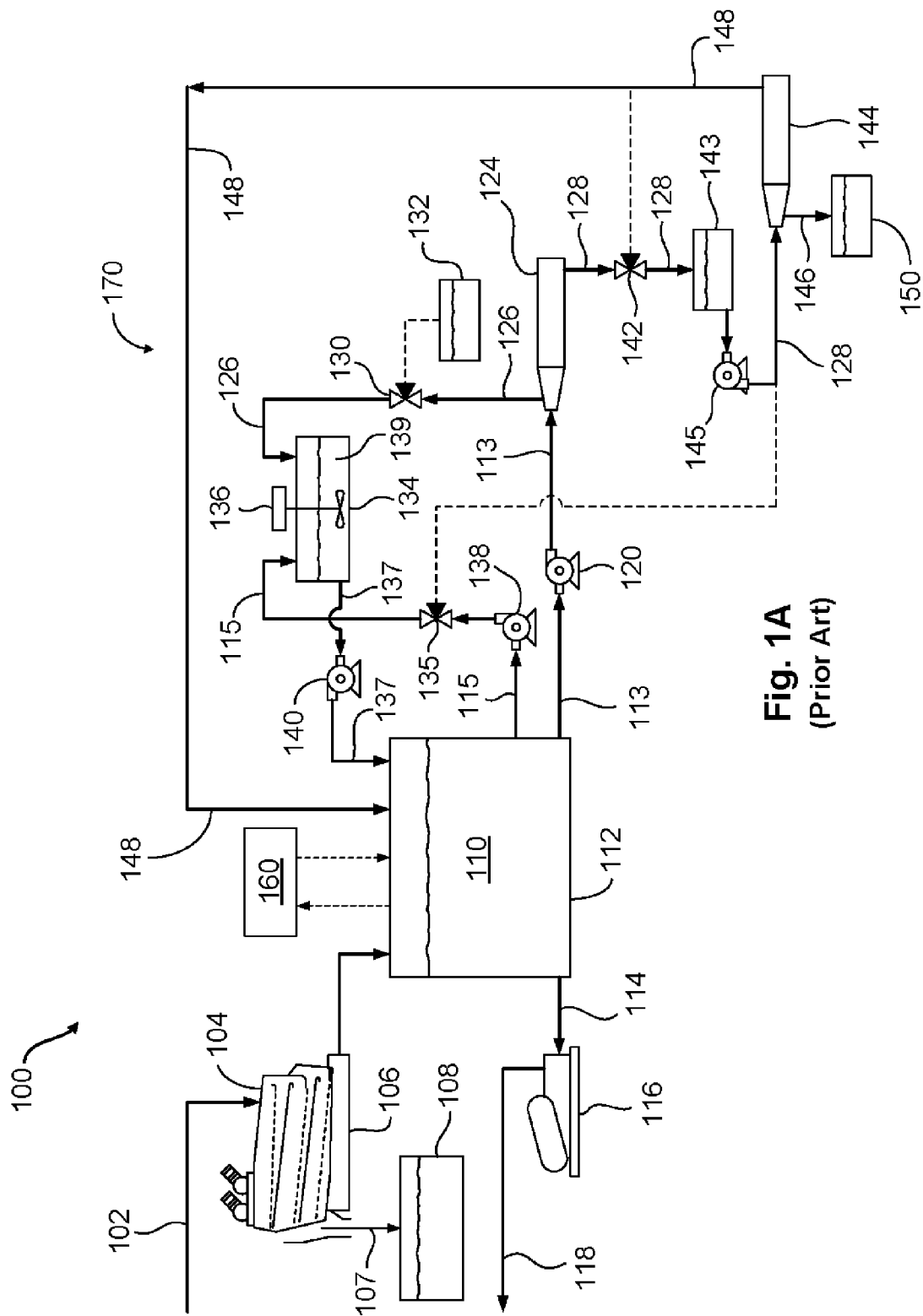
FIGS. 1A-1C are schematic flow diagrams depicting various operational configurations of an illustrative prior art barite recovery system.
Figure 1B:
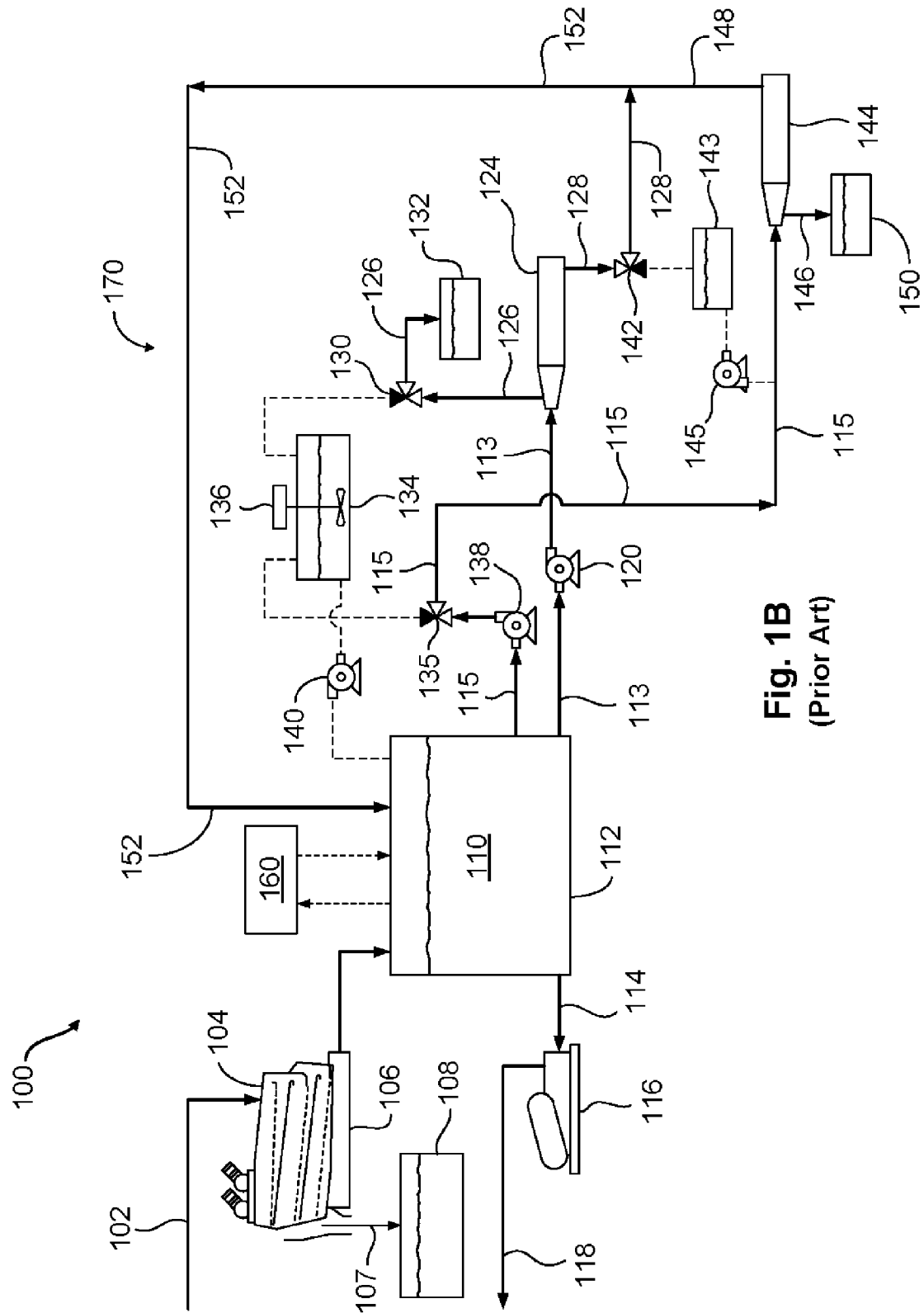
Figure 1C:
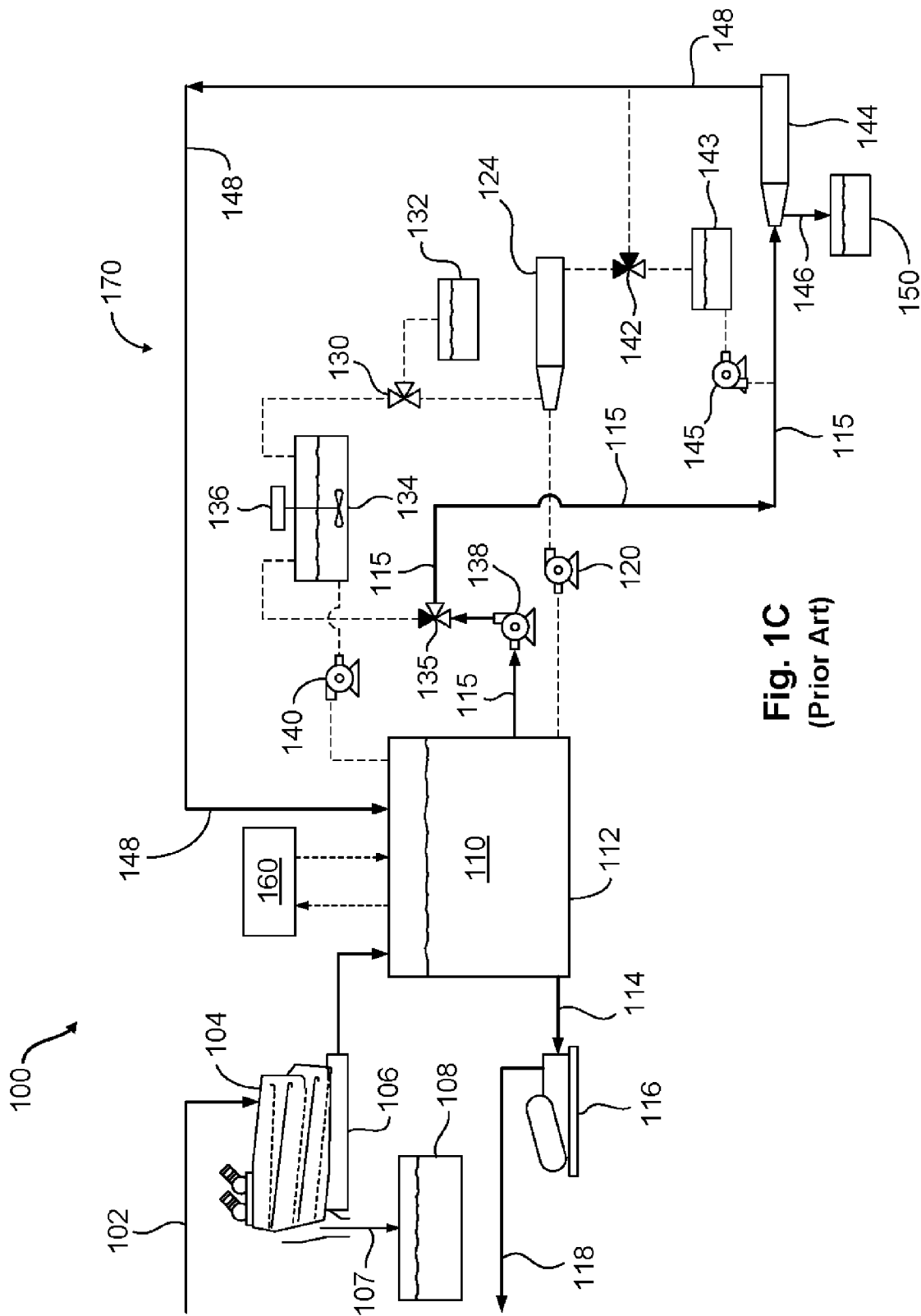

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention.

DETAILED DESCRIPTION

Various illustrative embodiments of the present subject matter are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various systems, structures and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the subject matter disclosed herein provides various embodiments of systems, components, and methods that may be used to recover high specific gravity solids particles, such as barite and the like, from spent drilling mud.

FIGS. 2A-2D are schematic flow diagrams that illustrate a drilling mud treatment system 200 in accordance with the present that includes a solids removal and recovery system 270 that can be configured to treat both weighted and unweighted drilling fluids. In the exemplary embodiment of the solids removal and recovery system 270 depicted in FIG. 2A, the system 270 is in an operational configuration that allows desirable high specific gravity particles, such as barite and the like, to be recovered from a drilling mud 210 and circulated back to the active mud system for re-use in further drilling operations. For simplicity of description, the solids removal and recovery system 270 may sometimes be referred to hereinafter as a barite recovery system 270.

Figure 2A:
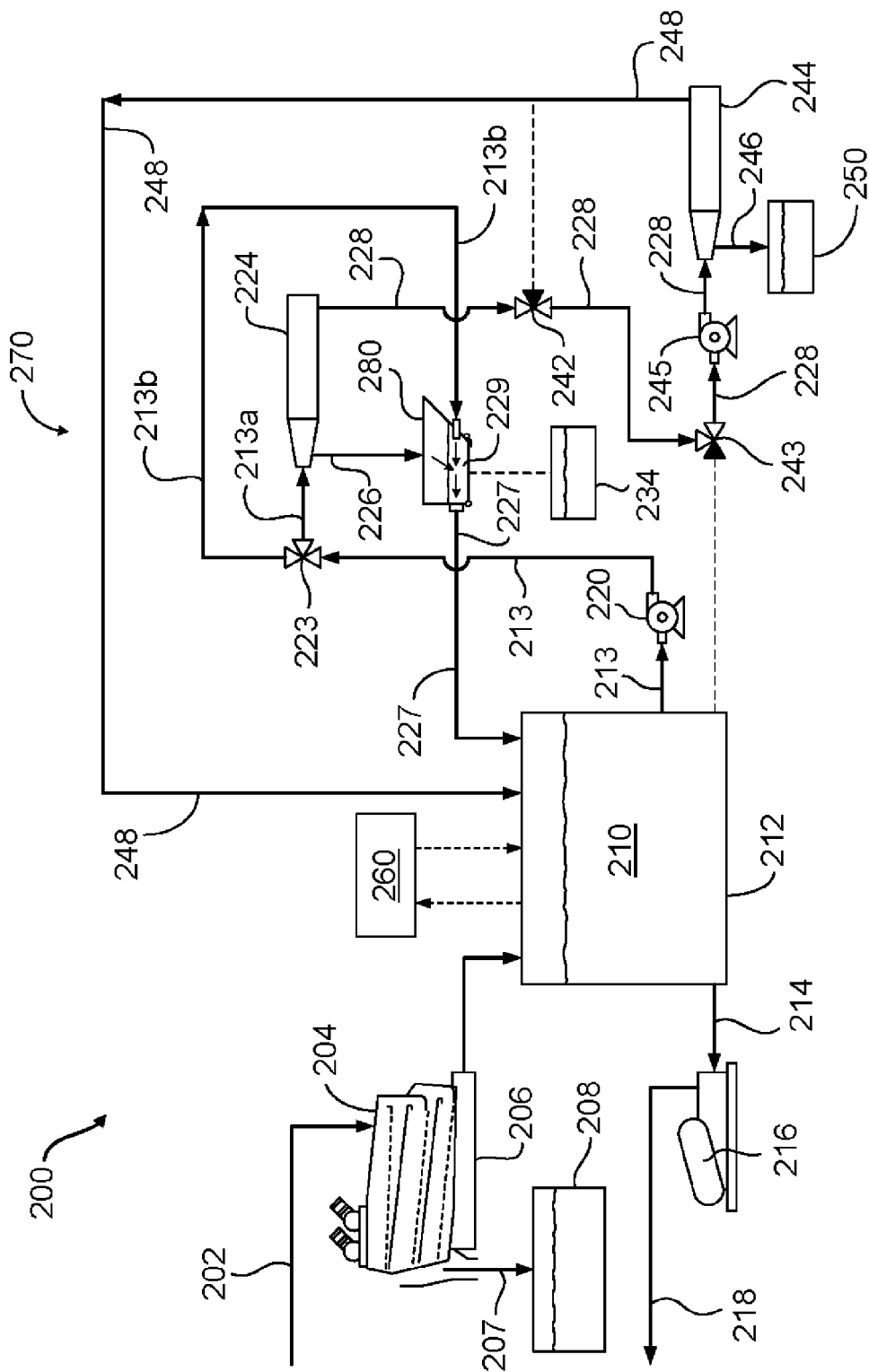
FIGS. 2A-2D are schematic flow diagrams depicting illustrative embodiments of a barite recovery system in accordance with the present disclosure.

As shown in FIG. 2A, drilling mud 210 that is returned from a drilled wellbore (not shown), sometimes referred to herein as "spent drilling mud," may flow through a spent mud flow line 202 to a primary solids separation apparatus 204, e.g., a shale shaker or other vibratory separator, where an initial separation step may be performed so as to remove large drilling cuttings particles 207 from the mud 210. The separated drilling cuttings 207 may then be directed to a drilling cuttings tank or pit 208, and the portions of the drilling mud 210 passing through the various screening decks of the shale shaker 204 may flow down to a sump 206, after which is it directed to the active mud system tank 212 for further processing.

In certain illustrative embodiments of the drilling mud treatment system 200, a flow of the drilling mud 210 may be directed through one or more intermediate mud treatment and/or solids separation apparatuses, which are collectively depicted schematically in FIG. 2A as system 260. In some embodiments, the system 260 may include, for example, an apparatus for removing entrained gases from the drilling mud 210 (e.g., vacuum or atmospheric degasser), one or more apparatus(es) for removing sand and/or silt from the mud 210 (e.g., desander and/or desilter hydrocyclones), the design and operation of which are well known in the art, and as such will not be further described herein.

As noted above, the system 270 of FIG. 2A is depicted in a configuration that is adapted for recovering desirable and beneficial high density solids particles, e.g., barite, from the drilling mud 210 for re-use in further drilling operations. In some exemplary embodiments, the barite recovery system 270 may include a first pump 220 that is adapted to circulate spent drilling mud 210 through a first decanter centrifuge 224 and a second pump 243 that is adapted to circulate spent drilling mud 210 through a second decanter centrifuge 244, each of which may be operated as required to remove different density solids particles from the mud 210, as will be further described below. Additionally, the barite recovery system 270 may also include a barite recovery hopper 280 that, in at least some configurations, may be adapted to mix recovered barite with a flow of drilling mud during the barite recovery process, and direct the recovered barite/drilling mud mixture 229 back to the active rig mud tank 212, as will also be described in further detail below. Also as shown in FIG. 2A, various illustrative embodiments of the barite recovery system 270 disclosed herein may include solids disposal pits or tanks 234 and 250, which, depending on the specific operational configuration of the system 270, may be used for temporary storage of the solids that are removed from the mud 210 using the respective first and second centrifuges 224 and 244 prior to eventual disposal. It should be understood that, depending on the specific arrangement of the first and second centrifuges, the solids disposal tanks 234 and 250 may be combined as a single solids disposal tank, however for simplicity, use and operation of each of the tanks 234 and 250 will be described separately below. Additionally, the barite recovery system may also include a plurality of flow redirection apparatuses 223, 242, and 243, which may be operated and/or configured as desired so as to direct various flows of drilling mud and/or decanter centrifuge overflows to appropriate locations or other apparatuses within the system 270, as will be further described below.

In some illustrative embodiments, the pump 220 may be operated to generate a flow 213 of drilling mud 210 from the mud tank 212 to a first flow redirection apparatus 223, such as a three-way valve and the like. As shown in FIG. 2A, the first flow redirection apparatus 223 may be operated so that a first flow portion 213a of the flow 213 of drilling mud 210 being pumped from the mud tank 212 by the pump 220 may be directed to the first decanter centrifuge 224, whereas a second flow portion 213b of the flow 213 may be directed to bypass the first centrifuge 224. Additionally, in certain aspects, the second flow portion 213b that bypasses the first centrifuge 224 may be circulated through the barite recovery hopper 280 (see, FIGS. 3A and 3B for additional details), where it may mix with and flush any barite that is recovered by the first centrifuge 224 back to the active mud tank 212, as will be further described below.

Returning now to the barite recovery system 270 shown in FIG. 2A, the first decanter centrifuge 224 may be adapted to receive the first flow portion 213a of drilling mud 210 directed thereto by the second flow redirection apparatus 223. In certain embodiments, the first centrifuge may be operated at a relatively low RPM (as previously described) so as to thereby separate the first flow portion 213a into a first solids underflow, or reject, portion 226 and a first fluid overflow portion 228. Depending on the operational parameters of the first decanter centrifuge, the first solids underflow portion 226 may primarily be composed of a relatively high percentage of barite, i.e., higher density solids particles, that may be mixed together with a small amount of drilling fluid so as to form a first solids underflow slurry 226. In some aspects, the first solids underflow slurry portion 226 may also include a relatively low percentage of drill cuttings, i.e., lower density solids particles. In certain other embodiments, the first fluid overflow portion 228 may primarily be made up of the base fluid of the drilling mud 210 as well as an amount of unseparated overflow solids. Depending on the specific operational parameters of the first decanter centrifuge 224, the unseparated overflow solids carried over with the first fluid overflow portion 228 may contain, for example, a relatively high percentage of drill cuttings, i.e., lower specific gravity solids particles, as well as, in some cases, a relatively low percentage of barite, i.e., higher specific gravity solids particles.

Upon exiting the underflow outlet of the first decanter centrifuge 224, the first solids underflow slurry portion 226, which, as noted above, may be primarily composed of recovered barite, may then flow into the barite recovery hopper 280. As depicted in FIG. 2A, the barite recovery hopper 280 is in a closed barite recovery configuration, thus allowing the recovered barite to be accumulated and subsequently re-used for further drilling operations. In at least some embodiments, the first solids underflow slurry portion 226 flowing from the first centrifuge 224 may then be mixed together in the barite recovery hopper 280 with the second flow portion 213b of drilling mud 210 so as to create a mixture 229 of recovered barite and drilling mud. A flow 227 of the recovered barite/mud mixture 229 from the barite recovery hopper 280 may then be directed back to the active mud tank 212, as shown in FIG. 2A. FIGS. 3A and 3B, which schematically illustrate some detailed aspects of one exemplary embodiment of a barite recovery hopper 280 in accordance with the present disclosure, are described below.

FIG. 3A schematically depicts the exemplary barite recovery hopper 280 in the barite recovery configuration of FIG. 2A. As shown in FIG. 3A, the barite recovery hopper 280 may include a body or shell 281 having a substantially open top 288 that is adapted to receive the first solids underflow portion 226 flowing from the first decanter centrifuge 224. In certain embodiments, the open top 288 of the barite recovery hopper 280 may be attached and sealed to a solids discharge chute 224c (schematically depicted by dashed lines in FIG. 3A) of the first centrifuge 224 so as to substantially prevent leakage while the barite recovery system 270 is being operated in the barite recovery mode. Additionally, the shell 281 may have a mud circulation inlet 282 that is adapted to receive the second flow portion 213b of drilling mud 210 bypassing the first decanter centrifuge 224 (see, FIG. 2A), and a mud circulation outlet 283 that is adapted to direct a flow 227 of the recovered barite/mud mixture 229 back to the mud tank 212. In certain embodiments, the mud circulation inlet 282 may include an internal projection portion 282p that may act as a jet or gun nozzle so as to facilitate a more thorough and complete mixing of the redirected bypass flow 213b entering the nozzle 282 from the first flow redirection apparatus 223 with the recovered barite exiting the first decanter centrifuge 224. See, FIG. 2A. Furthermore, in at least some embodiments of the barite recovery mode, an amount of the recovered barite/mud mixture 229 may sometimes accumulate inside of the barite recovery hopper 280, as shown in FIG. 3A.

In some illustrative configurations, the barite recovery hopper 280 may have a hopper bypass gate 284 that is adapted to be in a closed position so as to seal a bottom opening 289 (see, FIG. 3B) of the shell 281 while the hopper 280 is configured for operation in a barite recovery mode. In some embodiments, the shell 281 may include at least one seal plate 286 that substantially surrounds the bottom opening 289, and a sealing element or gasket 287 may be positioned between the seal plate 286 and the hopper bypass gate 284 so as to substantially seal the bottom opening 289 when the gate 284 is in a closed barite recovery mode, thereby reducing the likelihood of drilling mud leakage or bypass. During the barite recovery operation, the closed and sealed hopper bypass gate 284 generally acts to facilitate collection of the recovered barite in the hopper 280 so that it can mix and blend with the second flow portion 213b of the drilling mud 210 being circulated by the pump 220. Furthermore, the second flow portion 213b entering the barite recovery hopper 280 through the mud inlet 282 may also act to substantially continuously flush a flow 227 of the recovered barite/mud mixture 229 out of the hopper 280 and back to the mud tank 212 during barite recovery operations.

In certain embodiments, the hopper bypass gate 284 may be opened when the barite recovery system 270 is configured in a hopper bypass mode for treating unweighted drilling mud, thereby allowing the separated first underflow solids portion 226 to pass completely through, i.e. bypass, the barite recovery hopper, as will be further described in conjunction with FIGS. 2B-2D below. For example, the hopper bypass gate 284 may be pivotably attached to the shell 281, such as by one or more pinned or hinged connections 284h, which may thereby allow the hopper bypass gate 284 to be swung open to a hopper bypass position, as shown FIG. 3B. Additionally, the barite recovery hopper 280 may include one or more gate latches 285 (schematically depicted in FIGS. 3A and 3B) that are adapted to maintain the hopper bypass gate 284 in a closed position during barite recovery operations. In some embodiments, the latch(es) 285 may be also be pivotably attached to the shell 281, such as by one or more pinned or hinged connections 285h, so that the latch(es) 285 may be pivoted rotated away from a latching position against the hopper bypass gate 284, thereby allowing the gate 284 to be opened for hopper bypass operations.

Returning now to FIG. 2A, when the barite recovery system 270 is configured in the barite recovery mode, the first fluid overflow portion 228 exiting the overflow outlet of the first decanter centrifuge 224 may then flow to a second flow redirection apparatus 242, such as a three-way valve, a re-configurable flow chute or flexible flowline hose, and the like. As shown in FIG. 2a, the second flow redirection apparatus 242 may be operated so that substantially the entirety of the first fluid overflow portion 228 is directed to the suction side of a second pump 245 that is adapted to feed the first fluid overflow portion 228 to the inlet of the second decanter centrifuge 244, as indicated by the blackened flow branch of the apparatus 242. For example, in at least some embodiments, the second flow redirection apparatus 242 may be operated and/or configured so as to direct the first fluid overflow portion 228 to a third flow redirection apparatus 243, such as a three-way valve, that is positioned on the suction side of the second pump 245, and which may be operated so as to direct substantially the entirety of the fluid overflow 228 exiting the second decanter centrifuge 224 to the suction side of the pump 245, as indicated by the blackened flow branch of the third apparatus 243. Furthermore, in certain embodiments, the second decanter centrifuge 244 may receive the first fluid overflow portion 228 from the second pump 245 and be operated at a substantially higher RPM relative to that of the first centrifuge 224 (as described above) so as to thereby separate the first overflow portion 228 into a second solids underflow, or reject, portion 246 and second fluid overflow portion 248.

During some operations of the barite recovery system 270, the second solids underflow portion 246 exiting the second centrifuge 244 is directed to flow into a solids disposal tank or pit 250. Depending on the specific operating parameters of the second decanter centrifuge 244, the second solids underflow portion 246 may be composed primarily of lower density solids particles, e.g., drill cuttings and the like, mixed into a slurry with a small amount of drilling fluid. In certain aspects, the second solids underflow portion 246 may also include a relatively small amount of higher density solids particles, e.g., barite, that may have been carried over from the first centrifuge 224. Furthermore, the second fluid overflow portion 248 may exit the second decanter centrifuge 244 as a substantially "clean" drilling mud 210, that is, one which generally contains only relatively small amounts of either high or low density solids particles. As shown in FIG. 2A, the second fluid overflow portion 248 exiting the second centrifuge 244 may then be returned directly to the mud tank 212 for mixing and blending with the recovered barite prior to being re-used for subsequent drilling operations.

In some embodiments, the second fluid overflow portion 248, i.e., the "cleaned" drilling mud 210, is returned to the suction chamber or compartment (not shown) of the mud tank 212, along with the flow 227 of recovered barite/mud mixture 229. Thereafter, a mud pump 216 may be operated to draw the cleaned and treated drilling mud 210 through a suction line 214 from the suction chamber of the mud tank 212 and to pump the drilling mud 210 through a discharge line 218 and back down into the drilled wellbore (not shown).

Figure 2B:
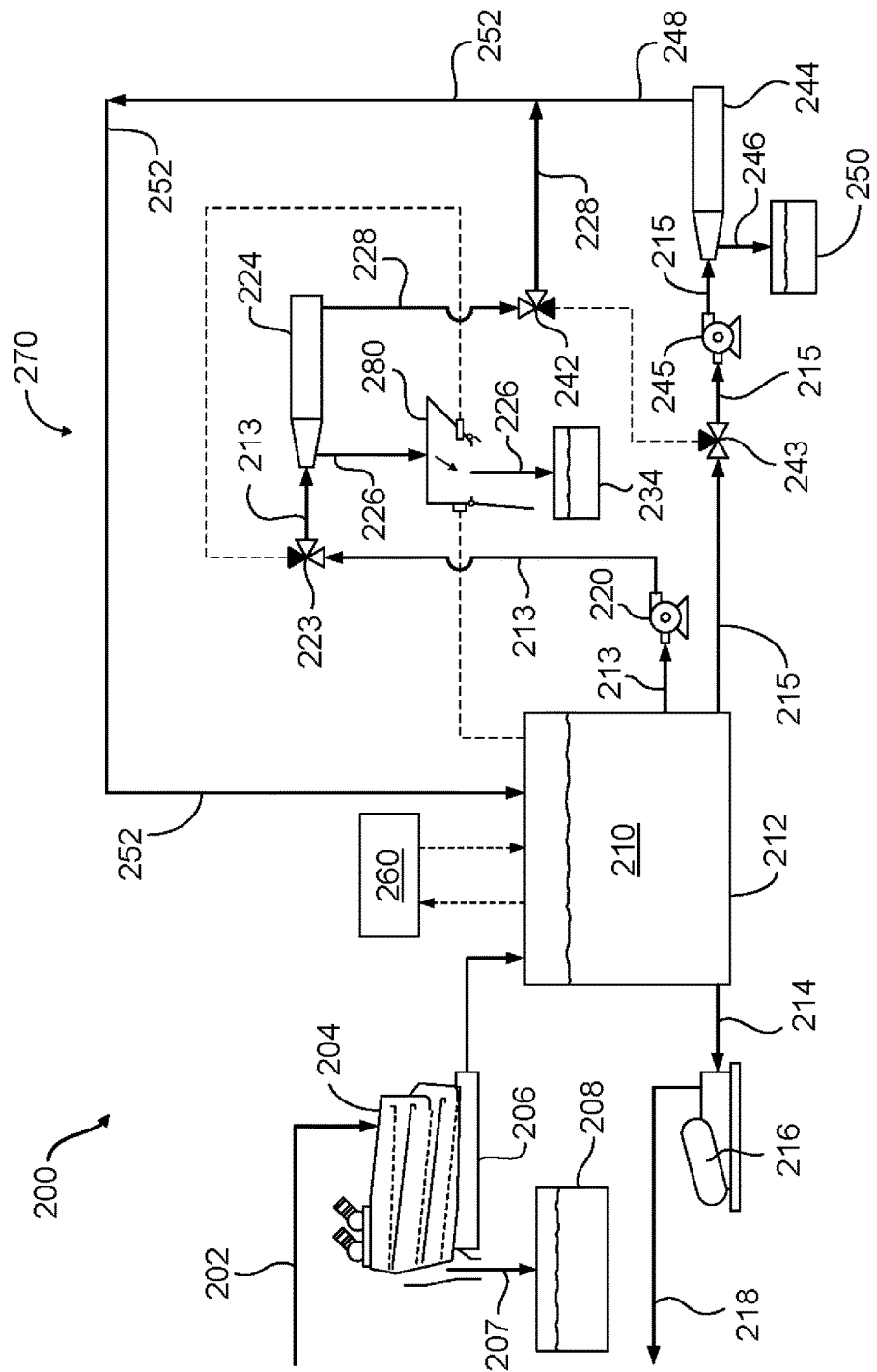
Figure 2C:
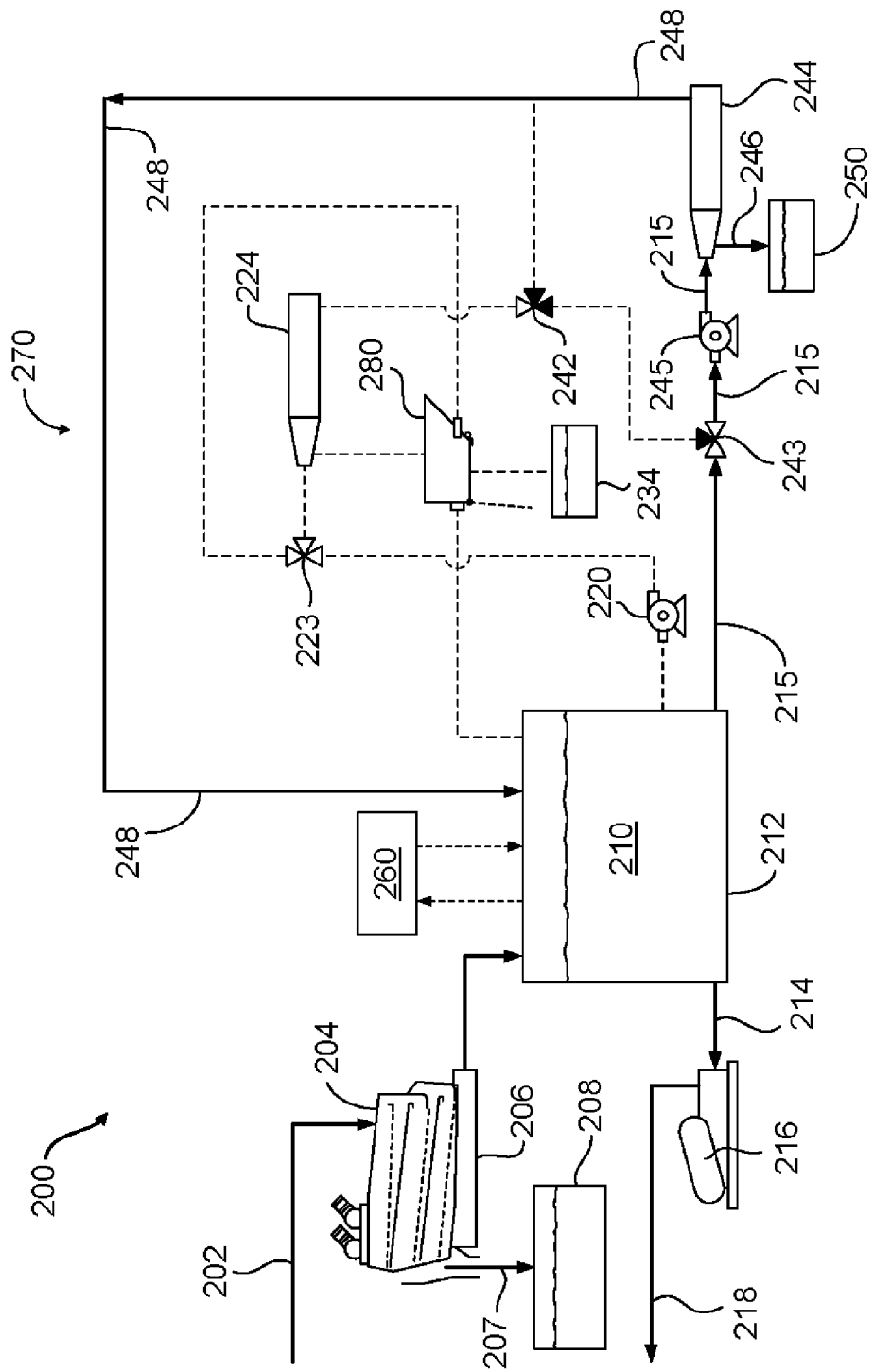
Figure 2D:
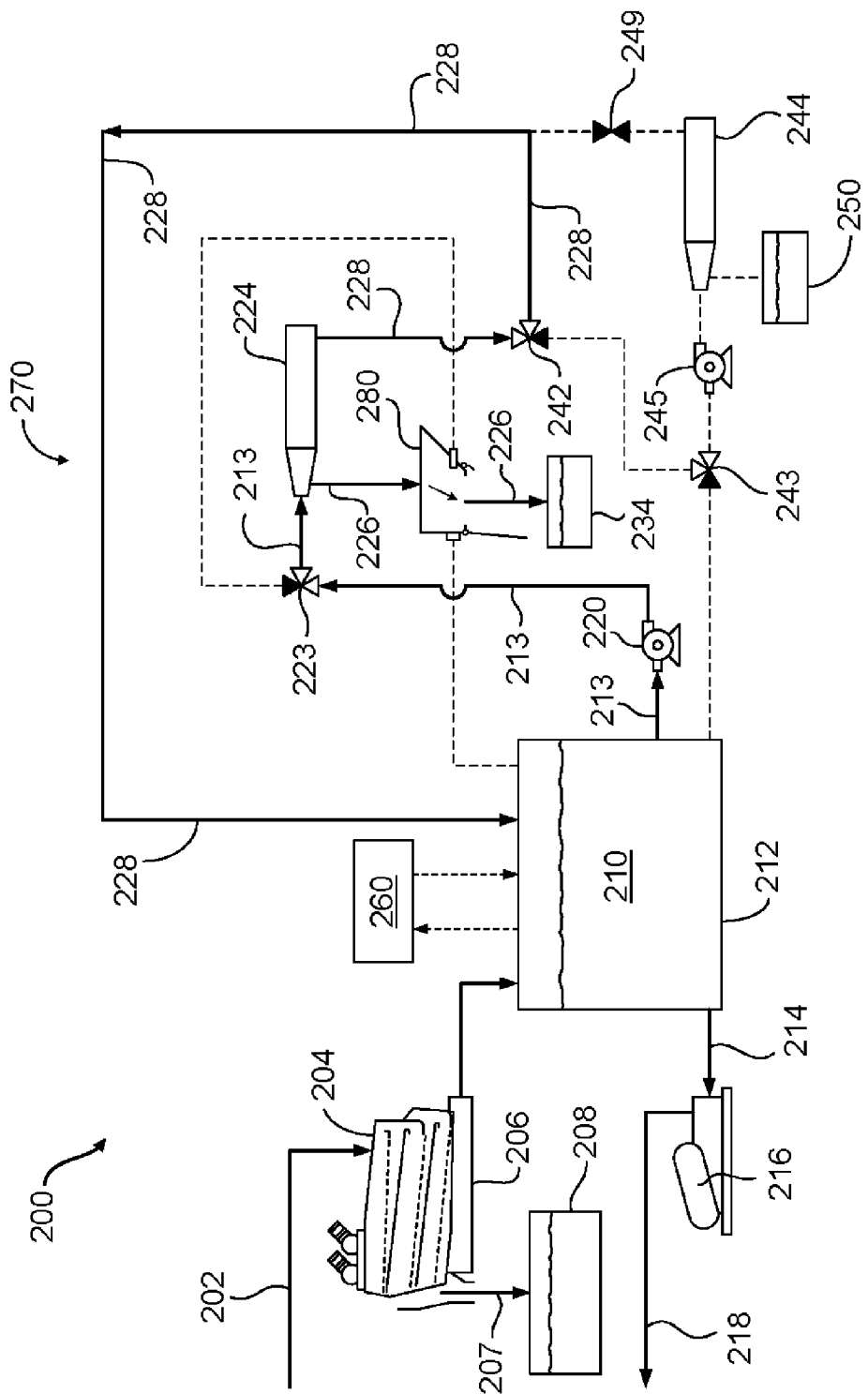

FIGS. 2B-2D schematically depict various illustrative configurations of the barite recovery system 270 shown in FIG. 2A that may be used to process unweighted drilling mud 210. In such embodiments, since no high density barite particles have been intentionally added to the drilling mud 210, substantially most of the solids particles present in the flow of drilling mud 210 to the system 270 represent drill cuttings, e.g., low density solids particles.

In some illustrative embodiments, the barite recovery system 270 may be configured with the first and second decanter centrifuges 224 and 244 arranged for parallel flow, that is, so that both decanter centrifuges 224, 244 receive and treat a flow of drilling mud that has a substantially similar composition. For example, as shown in FIG. 2B, the first flow redirection apparatus may be operated so as to direct substantially the entirety of the flow 213 of drilling mud 210 pumped from the mud tank 212 by the first pump 220 to the first decanter centrifuge 224, thus bypassing the barite recovery hopper 280. For reference, this barite recovery hopper bypass mode is indicated in FIG. 2B by the blackened flow branch of the first flow redirection apparatus 223 and the dashed line between the apparatus 223 and the mud circulation inlet 282 (see, FIG. 3A) of the barite recovery hopper 280. Additionally, the second and third flow redirection apparatuses 242, 243 may also be operated and/or configured so that the suction side of second pump 245 is in fluid communication with the active mud tank 212, as indicated by the blackened flow branches of the second and third flow redirection apparatuses 242, 243 and the dashed line between the two apparatuses 242, 243. In this way, the second pump 245 may generate a second flow 215 of drilling mud 210 from the mud tank 212 to the second decanter centrifuge 244, as shown in FIG. 2B.

For example, in one illustrative embodiment, flow between the second and third flow redirection apparatuses 242, 243 may be accomplished in the barite recovery mode of FIG. 2A by way of a flexible flowline hose and the like. In such embodiments, when flow to the suction side of the second pump 245 is reconfigured so as to draw a flow 215 of drilling mud 210 directly from the tank 212, the flexible flowline hose between the two flow redirection apparatuses 242, 243 may be disconnected from the second flow redirection apparatus 242 and connected directly to a suction nozzle (not shown) on the mud tank 212. However, it should be appreciated by those of ordinary skill after a complete reading of the present disclosure that other valving and/or plumbing configurations may also be utilized.

In the exemplary embodiment schematically depicted in FIG. 2B, the first and second centrifuges 224 and 244 may therefore be arranged in parallel, such that the composition of the drilling mud 210 received by each via the respective flows 213 and 215 may be substantially the same. Furthermore, in some embodiments, the first and second centrifuges 224, 244 may be operated based upon substantially similar operational parameters, such as mud feed rate, rotational speed (RPM's), and the like, so that as much of the solids particles, e.g., drill cuttings, as possible may be removed from the drilling mud 210, irrespective of particle size and/or particle specific gravity. However, it should be understood that each centrifuge 224, 244 may be operated using substantially different operational parameters, depending on the overall solids particle separation requirements established for the particular application.

For example, in certain embodiments of the configuration illustrated in FIG. 2B the first decanter centrifuge 224 may be operated so as to separate the flow 213 into a first solids underflow portion 226 and a first fluid overflow portion 228. Depending on the operational parameters of the first centrifuge 224, the first solids underflow portion 226 may be, for example, a slurry containing a very high percentage of the solids particles that initially entered the first centrifuge 224 mixed together with a small amount of drilling fluid, whereas the first fluid overflow portion 228 may be a substantially "clean" drilling mud 210 that generally contains only relatively small amounts solids particles, and may therefore be in condition for re-use in further drilling operations. Furthermore, since there is no barite to recover from the drilling mud 210, the barite recovery hopper 280 may be configured in the hopper bypass mode, that is, wherein the hopper bypass gate 284 has been opened, as shown in FIG. 2B. See also, FIG. 3B. In the hopper bypass configuration, the first solids underflow portion 226 exiting the first decanter centrifuge 224 may thus be allowed to flow through the barite recovery hopper 280 to a solids disposal tank or pit 234, thereby bypassing the barite recovery hopper 280 substantially without being held up. Also, and as previously noted, the second flow redirection apparatus 242 may be operated and/or configured so that the first fluid overflow portion 228 exiting the first centrifuge 224 bypasses the second centrifuge 244, as indicated in FIG. 2B by the blackened flow branch of the apparatus 242 and the dashed line between the second flow redirection apparatus 242 and the third flow redirection apparatus 243.

Similarly, the second decanter centrifuge 244 may be operated so as to separate the flow 215 into a second solids underflow portion 246 and a second fluid overflow portion 248, each of which may have substantially similar characteristics and compositions to the respective first solids underflow portion 226 and first fluid overflow portion 228. As shown in FIG. 2B, the second solids underflow portion 246 may then flow into the solids disposal tank 250. Furthermore, the second fluid overflow portion 248 exiting the second centrifuge 244 and the first fluid overflow portion 228 bypassing the second centrifuge 244 may then flow together so as to form a substantially "clean" flow 252 of drilling mud, which may in turn be directed back to the drilling rig's active mud tank 212 for recirculation into the drilled wellbore (not shown) by the mud pump 216, as previously described.

FIG. 2C schematically illustrates the barite recovery system 270 in a further exemplary configuration for treating unweighted drilling mud 210 that is different from that shown in FIG. 2B. In particular, FIG. 2C depicts the barite recovery system 270 wherein the third flow redirection apparatus 243 is again operated and/or configured so as to direct the flow 215 of drilling mud 210 to the second pump 243 and from there to the second decanter centrifuge 244. On the other hand, the first pump 220 may be shut in, that is, not operated to direct a flow of drilling mud 210 to the first flow redirection apparatus 223 and the first decanter centrifuge 228, as indicated by the dashed lines between the mud tank 212 and the first pump 220 and between the first pump 220 and the first apparatus 223. Additionally, since both the first decanter centrifuge 224 and the barite recovery hopper 280 are bypassed in the depicted system configuration, the position of the hopper bypass gate 284 (closed or open) does not affect the treatment of the flow 215 of drilling mud 210. Accordingly, the hopper bypass gate may be in either a closed position or an open position, (open position is indicated by a dashed line in FIG. 2C). Furthermore, in some embodiments, the second and third flow redirection apparatuses 242, 243 may be operated and/or configured so as to prevent any backflow of drilling mud 210 or overflow 248 exiting the second decanter centrifuge 244 from entering the underflow outlet of the first decanter centrifuge 224. For reference, this backflow prevention configuration is indicated by the blackened flow branches of the apparatuses 242, 243, the dashed line between the two flow redirection apparatuses 242, 243, and the dashed lines between the apparatus 242 and the inlet and fluid overflow outlet of the second decanter centrifuge 244.

In the operational configuration of the barite recovery system 270 shown in FIG. 2C, the second decanter centrifuge 244 may be adapted to receive substantially the entire flow 213 of drilling mud 210 generated by the pump 220. In some embodiments, the second decanter centrifuge 244 may be operated so as to separate the flow 213 into a solids underflow portion 246, which may be discarded into the solids disposal tank 250 as previously noted, and a substantially "clean" drilling fluid overflow portion 248, which may be directed back to the mud tank 212 for subsequent re-use in further drilling operations. The configuration of the barite recovery system 270 depicted in FIG. 2C may sometimes be used when the volumetric flow requirements for the drilling mud quantities necessary to support drilling operations are substantially reduced, as compared to what can be readily treated in the parallel flow system configuration of FIG. 2B, or when the first decanter centrifuge 224 is taken out of service for maintenance and/or repair.

FIG. 2D schematically illustrates the barite recovery system 270 in yet a further exemplary configuration that may be used treating unweighted drilling mud 210 that is different from the configurations depicted in FIGS. 2B and 2C. For example, as shown in FIG. 2D, the barite recovery system 270 may be configured so that the first pump 220 is operated to generate a flow 213 of drilling mud 210 to the first flow redirection apparatus 223. Furthermore, the first flow redirection apparatus may be operated and/or configured so as to direct substantially the entirety of the flow 213 to the first decanter centrifuge 224, in similar fashion to that shown in FIG. 2B and described above. Additionally, the second pump 245 may be shut in and the second and third flow redirection apparatuses 242 and 243 may both be operated and/or configured so that the second decanter centrifuge 248 is bypassed, i.e., not in operation. For reference, this second decanter centrifuge bypass mode is indicated in FIG. 2D by the blackened flow branches of the second and third flow redirection apparatuses 242, 243 and the dashed lines between the mud tank 212 and the third flow redirection apparatus 243, between the respective apparatuses 242, 243, and between the second apparatus 243, the second pump 245, and the second centrifuge 244. Moreover, in at least some embodiments, an additional flow apparatus 249 may positioned downstream of the overflow outlet of the second centrifuge 244, and may also be operated so as to prevent any backflow of drilling mud 210 exiting the overflow outlet of the first centrifuge 224 from entering the over outlet of the second decanter centrifuge 244, as is indicated by the blackened flow branches of the flow control apparatus 249.

In the operational configuration of the barite recovery system 270 shown in FIG. 2D, the first decanter centrifuge 224 may be adapted to receive substantially the entire flow 213 of drilling mud 210 generated by the pump 220, as noted above. Furthermore, the first decanter centrifuge 224 may be operated so as to separate the flow 213 into a solids underflow portion 226, which may be discarded into the solids disposal tank 234 while hopper bypass gate 284 of the barite recovery hopper 280 is opened to a hopper bypass position as previously described, and a substantially "clean" drilling fluid overflow portion 228, which may be directed to the third flow redirection apparatus 242, which is operated so as to send the "clean" drilling fluid overflow portion 228 back to the mud tank 212 for subsequent re-use in further drilling operations. As with the system configuration depicted in FIG. 2C above, the system configuration of FIG. 2D may also be used for those applications wherein the volumetric flow requirements for the drilling mud quantities are substantially reduced as compared to what can be treated in the parallel flow system configuration of FIG. 2B, or when the second decanter centrifuge 244 is shut down for maintenance and/or repair.

As may be appreciated by those of ordinary skill after a complete reading of the present disclosure, the barite recovery system 270 and barite recovery hopper 280 disclosed herein address several of the various shortcomings associated with the prior art barite recovery systems. For example, the exemplary barite recovery systems 270 described above eliminates at least two of the mud circulation pumps that are used in the prior art barite recovery system 170, including the pump 140 that is used to pump the flow 137 of blended drilling mud/recovered barite mixture 139 from the barite mixing tank 134 to the mud tank 112, and the pump 145 that is used to pump the first fluid underflow portion 128 from the underflow staging tank 143 to the second centrifuge 144. Furthermore, the additional piping that is necessary to interconnect the mud circulation pumps 140 and 145 to the other equipment of the prior art system 170 may also eliminated. Additionally, the barite mixing tank 134 and the overflow staging tank 143 of the prior art barite recovery system 170 are both eliminated, as is the mud agitator 136 that is used to mix and blend recovered barite with drilling mud in the barite mixing tank 134. Instead, the presently disclosed barite recovery system 270 is adapted to utilize only a single pump 220 to feed drilling mud 210 to the first decanter centrifuge 224, as well as to circulate the drilling mud 210 through the barite recovery hopper 280 and blend the drilling mud 210 with recovered barite in the hopper 280. Moreover, only a single pump 245 is used to feed the second decanter centrifuge 244, whether during a barite recover operation, or when treating unweighted drilling mud.

Accordingly, the first pump 220 of the barite recovery system 270 may therefore be used to perform multiple functional operations with the first decanter centrifuge 224—e.g., feeding, flushing, and blending—and the second pump 245 may be used for feeding the second decanter centrifuge 244 when treating either weighted or unweighted drilling muds, whereas multiple pumps 120, 138, 140, and 145 are required to perform the same functional operations in the prior art barite recovery system 170. Additionally, the use of the single pump 220 for the feed, flush, and blending operations associated with the barite recovery mode of operation substantially eliminates the need for additional volumes of drilling mud, as is required for operating the barite mixing tank 134 and mud circulation pumps 138, 140 of the prior art system 170. Moreover, since the barite recovery hopper 280 of the system 270 may be directly attached and sealed to the first decanter centrifuge 224, as opposed to the open-topped barite mixing tank 134 of the prior art system 170, the likelihood for drilling mud spillage occurring with the system 270 during barite recovery operations may be substantially reduced, together with the costs associated with any resulting cleanup requirements and drilling mud replacement.

As a result, the subject matter disclosed herein provides detailed aspects of various systems, apparatuses, and methods that may be used for recovering various beneficial solids particles, such as barite and the like, from spent drilling mud for re-use in wellbore drilling operations.

The particular embodiments disclosed above are illustrative only, as the invention may be modified and practiced in different but equivalent manners apparent to those skilled in the art having the benefit of the teachings herein. For example, the method steps set forth above may be performed in a different order. Furthermore, no limitations are intended by the details of construction or design herein shown. It is therefore evident that the particular embodiments disclosed above may be altered or modified and all such variations are considered within the scope and spirit of the invention. Accordingly, the protection sought herein is as set forth in the claims below.

What is claimed:

1. A barite recovery hopper, comprising:
    a shell having an open top, said barite recovery hopper being adapted to receive a flow of recovered barite particles from a solids discharge chute of a decanter centrifuge through said open top of said shell;
    an inlet that is adapted to receive a flow of drilling mud from a mud tank;
    a hopper bypass gate that is adapted to seal a bottom opening of said shell when said hopper bypass gate is in a closed position during a barite recovery operation and to allow collection of at least a portion of said recovered barite particles for mixture, inside of said barite recovery hopper, with said flow of said drilling mud received through said inlet when said hopper bypass gate is in said closed position, said hopper bypass gate being further adapted to be in an open position during a hopper bypass operation so as to allow solids particles discharged from said decanter centrifuge through said solids discharge chute to pass through said barite recovery hopper and out of said bottom opening; and
    an outlet that is adapted to discharge a flow of said recovered barite particle/drilling mud mixture to said mud tank when said hopper bypass gate is in said closed position.

2. The barite recovery hopper of claim 1, wherein said open top of said shell is adapted to be attached and sealed to said solids discharge chute.

3. The barite recovery hopper of claim 1, wherein said hopper bypass gate is pivotably attached to said shell.

4. A system for separating solids particles from drilling mud, the system comprising:
    a pump adapted to generate a flow of said drilling mud from a mud tank;
    a decanter centrifuge;
    a solids particle recovery hopper; and
    a flow redirection apparatus adapted to direct a first flow portion of said flow of drilling mud to said decanter centrifuge and to direct a second flow portion of said flow of drilling mud to said solids particle recovery hopper, wherein said decanter centrifuge is adapted to separate a first portion of said solids particles from a second portion of said solids particles and to direct an underflow comprising said first portion of said solids particles to said solids particle recovery hopper, and wherein said solids particle recovery hopper is adapted to create a mixture of said underflow and said second flow portion and to direct a flow of said mixture to said mud tank.

5. The system of claim 4, wherein a specific gravity said first portion of said solids particles is greater than a specific gravity of said second portion of said solids particles.

6. The system of claim 4, wherein said decanter centrifuge is a first decanter centrifuge and the system further comprises a second decanter centrifuge, said first decanter centrifuge being adapted to direct an overflow comprising said second portion of said solids particles to said second decanter centrifuge.

7. The system of claim 6, wherein said second decanter centrifuge is adapted to separate said overflow received from said first decanter centrifuge into a second underflow comprising said second portion of said solids and second overflow, and to direct said second overflow to said mud tank.

8. The system of claim 6, wherein said flow redirection apparatus is a first flow redirection apparatus and the system further comprises a second flow redirection apparatus, said second flow redirection apparatus being adapted to direct a second flow of said drilling fluid to said second decanter centrifuge, said first flow redirection apparatus being further adapted to direct a first flow of said drilling fluid to said first decanter centrifuge and to bypass said solids particle recovery hopper.

9. The system of claim 4, wherein said solids particle recovery hopper comprises a hopper bypass gate.

10. The system of claim 9, wherein said hopper bypass gate is adapted to be in a closed position when said solids particle recovery hopper is receiving said underflow and said second flow portion and when creating said mixture during a solids particle recovery operation.

11. The system of claim 9, wherein said hopper bypass gate is adapted to be in a closed position when said drilling mud pumped from said mud tank by said pump is a weighted drilling mud comprising barite and wherein said hopper bypass gate is adapted to be in an open position when said drilling mud pumped from said mud tank by said pump is an unweighted drilling mud.

12. The barite recovery hopper of claim 1, further comprising a sealing element that is adapted to be positioned between said hopper bypass gate and said shell and to seal said bottom opening when said hopper bypass gate is in said closed position.

13. A system for separating solids particles from drilling mud, the system comprising:
- a pump adapted to generate a flow of said drilling mud from a mud tank;
- a decanter centrifuge;
- a solids particle recovery hopper, comprising:
  - a shell having an open top;
  - an inlet;
  - an outlet; and
  - a hopper bypass gate; and
- a flow redirection apparatus adapted to direct a first flow portion of said flow of drilling mud to said decanter centrifuge and to direct a second flow portion of said flow of drilling mud to said solids particle recovery hopper through said open top of said shell, wherein said decanter centrifuge is adapted to separate a first portion of said solids particles from a second portion of said solids particles and to direct an underflow comprising said first portion of said solids particles to said solids particle recovery hopper through said inlet, said solids particle recovery hopper being adapted to create a mixture of said underflow and said second flow portion and to direct a flow of said mixture to said mud tank through said outlet.

14. The system of claim 13, wherein said hopper bypass gate is adapted to seal a bottom opening of said shell when said hopper bypass gate is in a closed position, and to allow solids particles to pass through said solids particle recovery hopper and out of said bottom opening when said hopper bypass gate is in an open position.

15. The system of claim 14, wherein said solids particle recovery hopper further comprises a sealing element for sealing said bottom opening, said sealing element being positioned between said hopper bypass gate and said shell when said hopper bypass gate is in said closed position.

16. The system of claim 13, wherein said open top of said shell is attached and sealed to a solids discharge chute of said decanter centrifuge.

17. The system of claim 13, wherein said hopper bypass gate is pivotably attached to said shell of said solids particle recovery hopper.

18. The system of claim 13, wherein said decanter centrifuge is a first decanter centrifuge and the system further comprises a second decanter centrifuge, said first decanter centrifuge being adapted to direct an overflow comprising said second portion of said solids particles to said second decanter centrifuge.

19. The system of claim 18, wherein said second decanter centrifuge is adapted to separate said overflow received from said first decanter centrifuge into a second underflow comprising said second portion of said solids and second overflow, and to direct said second overflow to said mud tank.

20. The system of claim 18, wherein said flow redirection apparatus is a first flow redirection apparatus and the system further comprises a second flow redirection apparatus, said second flow redirection apparatus being adapted to direct a second flow of said drilling fluid to said second decanter centrifuge, said first flow redirection apparatus being further adapted to direct a first flow of said drilling fluid to said first decanter centrifuge and to bypass said solids particle recovery hopper.

* * * * *